United States Patent
Heim et al.

Patent Number: 5,600,519
Date of Patent: Feb. 4, 1997

[54] CONTROLLED SATURATION THIN FILM MAGNETIC WRITE HEAD

[75] Inventors: David E. Heim, Redwood City; Mason L. Williams, III, San Jose, both of Calif.

[73] Assignee: International Business Machines Corporation, Armonk, N.Y.

[21] Appl. No.: 399,781

[22] Filed: Mar. 6, 1995

[51] Int. Cl.$^6$ .................. G11B 5/147; G11B 5/187
[52] U.S. Cl. ................................................ 360/126
[58] Field of Search ............................. 360/119, 122, 360/125, 126

[56] References Cited

U.S. PATENT DOCUMENTS

| | | | |
|---|---|---|---|
| 4,819,111 | 4/1989 | Keel et al. | 360/125 |
| 4,839,197 | 6/1989 | Henderson | 427/116 |
| 4,878,290 | 11/1989 | Masud et al. | 29/603 |
| 5,134,535 | 7/1992 | Mallary | 360/126 |
| 5,168,410 | 12/1992 | Liao | 360/125 |
| 5,245,493 | 9/1993 | Kawabe et al. | 360/126 |
| 5,255,142 | 10/1993 | Williams et al. | 360/126 |
| 5,325,254 | 6/1994 | Cooperrider | 360/126 |
| 5,373,408 | 12/1994 | Bischoff | 360/126 |
| 5,479,310 | 12/1995 | Atsushi et al. | 360/126 |

*Primary Examiner*—Jefferson Evans
*Attorney, Agent, or Firm*—Leslie G. Murray; Paik Saber

[57] ABSTRACT

A thin film magnetic head in which the width of the first and second magnetic yoke layers between the zero throat point and the yoke flare point is progressively widened to equalize the flux density over this length so that the whole length reaches saturation simultaneously at a single current. Consequently, the field at the gap at the air bearing surface increases insignificantly once saturation of this length occurs, and the write field is then constant for currents above the saturation value.

6 Claims, 7 Drawing Sheets

CONTROLLED SATURATION THIN FILM MAGNETIC WRITE HEAD

BACKGROUND OF THE INVENTION

1. Field of the Invention

This invention relates in general to magnetic heads and, more particularly, to a thin film magnetic write head.

2. Description of the Prior Art

Thin film magnetic heads are used extensively in data storage devices such as disk drives. One thin film magnetic head design is shown in commonly assigned U.S. Pat. No. 4,878,290. U.S. Pat. No. 5,255,142 also describes a similar thin film magnetic head design. The thin film magnetic heads 2 of this type (see FIG. 1) comprise a magnetic yoke 3 which includes two magnetic layers which are in contact in the back gap region 4, are spaced apart in the central region, and spaced apart a small distance in the pole tip region 5 to form a transducing gap. The magnetic yoke 3 is energized by a flat coil 6 deposited in the space between the two magnetic layers in the central region. The magnetic yoke layers have a substantially constant width in the pole tip region which extends to a flare point 7 at which point the width of the magnetic yoke layers becomes progressively greater and this wider area extends to the back gap region 4.

Thin film magnetic heads of this type have been successfully used in many applications over a period of years. However, in this type of head the gap field continues to increase with increasing write current which makes it unsuitable for some applications which require the write field to be constant for an extended range of write currents.

SUMMARY OF THE INVENTION

It is therefore the principal object of this invention to provide a thin film magnetic head in which the write field is constant over a large current range.

In accordance with the present invention, a thin film magnetic head comprises a first magnetic yoke layer extending from a pole tip region to a back gap region, and a second magnetic yoke layer which is separated by a predetermined small distance from the first magnetic yoke layer at the pole tip region to produce a transducing gap, begins to diverge from the first magnetic yoke layer at a zero throat point to form a space between the magnetic yoke layers at a central region and is in contact with the first magnetic yoke layer at the back gap region. The magnetic yoke layers extend from the zero throat point toward said back gap region to a flare point at which the magnetic yoke layers increase progressively in width. The yoke structure is activated by a conductor coil deposited in the space between the magnetic yoke layers. The width of the first and the second magnetic yoke layers is progressively widened between the zero throat point and the flare point so that, when a write current is applied to the coil, the length of the magnetic yoke layers from the zero throat point to the flare point is saturated substantially simultaneously so that the write field is then constant for write currents above the saturation value.

DESCRIPTION OF THE PREFERRED EMBODIMENTS

Figure 2:
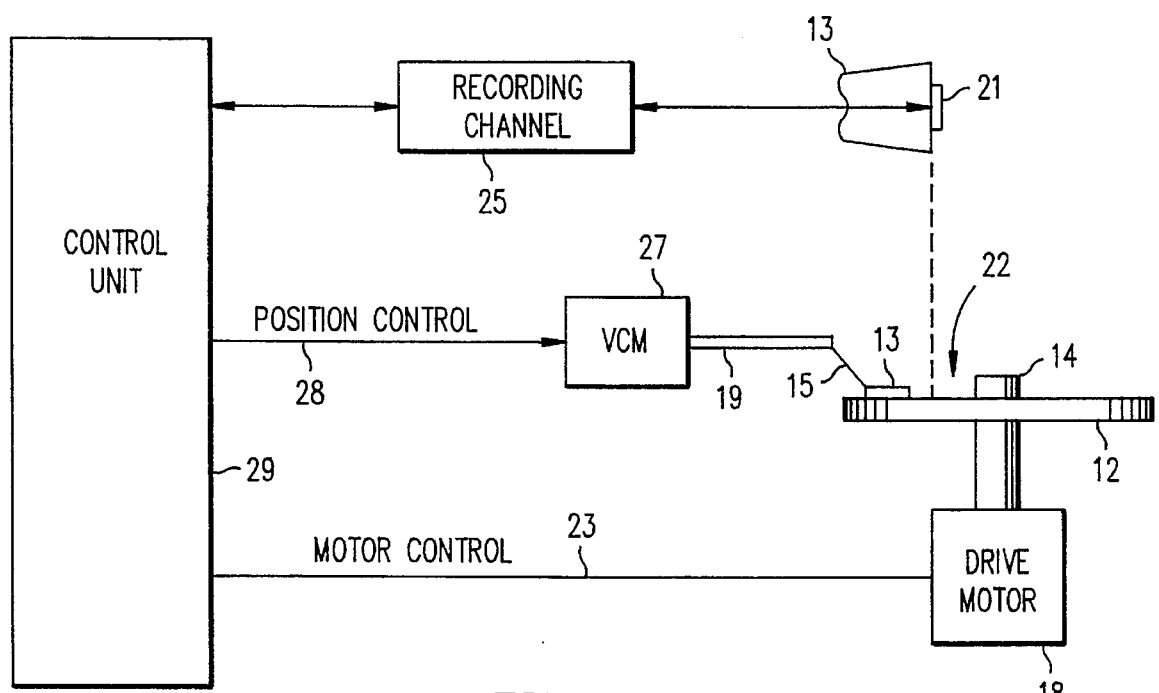
FIG. 2 is a simplified block diagram of a magnetic disk storage system embodying the present invention.

Referring now to FIG. 2, although the invention is described ms embodied in a magnetic disk storage system as shown in FIG. 2, it will be apparent that the invention is also applicable to other magnetic recording systems such as a magnetic tape recording system, for example, or other applications in which a sensor is utilized to detect a magnetic field. A magnetic disk storage system comprises at least one rotatable magnetic disk 12 which is supported on a spindle 14 and rotated by a disk drive motor 18. The magnetic recording media on each disk is in the form of an annular pattern of concentric data tracks (not shown) on disk 12.

Figure 1:
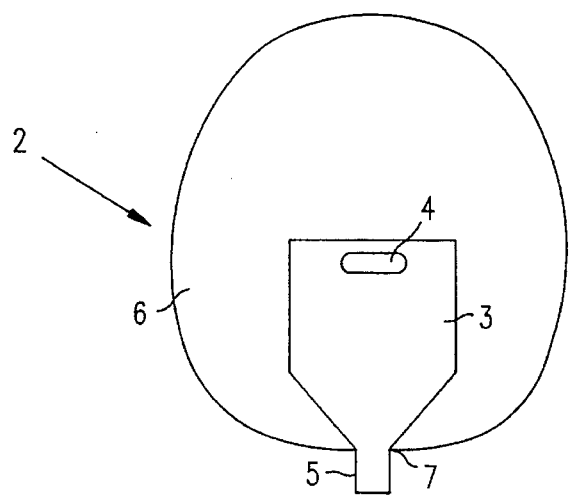
FIG. 1 is a top view of a thin film magnetic head according to the prior art.

At least one slider 13 is positioned on the disk 12, each slider 13 supporting one or more magnetic read/write transducers 21, typically referred to as read/write heads. As the disks rotate, the sliders 13 are moved radially in and out over the disk surface 22 so that the heads 21 may access different portions of the disk where desired data is recorded. Each slider 13 is attached to an actuator arm 19 by means of a suspension 15. The suspension 15 provided a slight spring force which biases the slider 13 against the disk surface 22. Each actuator arm 19 is attached to an actuator means 27. The actuator means as shown in FIG. 1 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 12 generates an air bearing between the slider 13 and the disk surface 22 which exerts an upward force or lift on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 2 are for representation purposes only. It should be apparent that disk storage systems may contain a large number of sliders.

According to a feature of the present invention, the width of the portion of the magnetic pole between zero throat height and the point at which the pole begins to flare to form the yoke portion gradually increases, i.e., forms a taper from the zero throat height to the flare point. The amount of width increase is chosen to equalize the flux density over the length of the taper. Thus the whole length of the taper reaches saturation simultaneously at a predetermined current. When saturated, the length functions as a very wide air gap for any additional flux to the pole tips. Consequently, the field at the transducing gap at the air bearing surface (ABS) increases insignificantly once saturation of the length occurs, and the write field is then constant for write currents above the saturation value.

Figure 3:
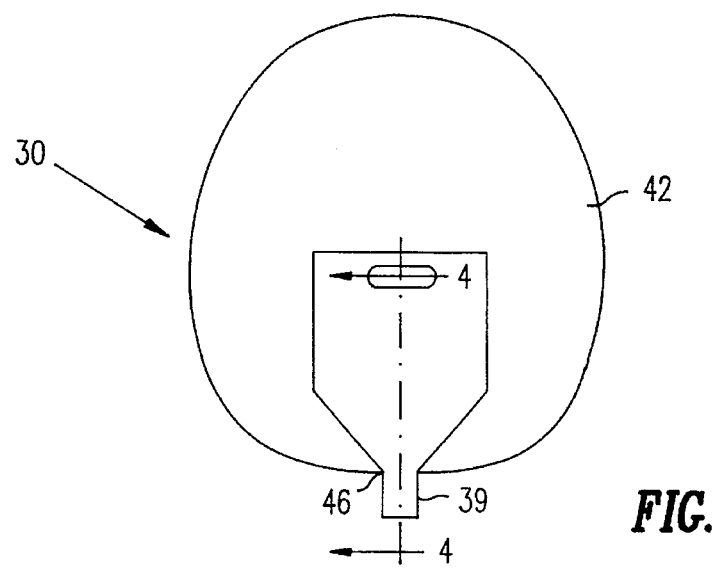
FIG. 3 is a top view of a thin film magnetic head according to the present invention.
Figure 4:
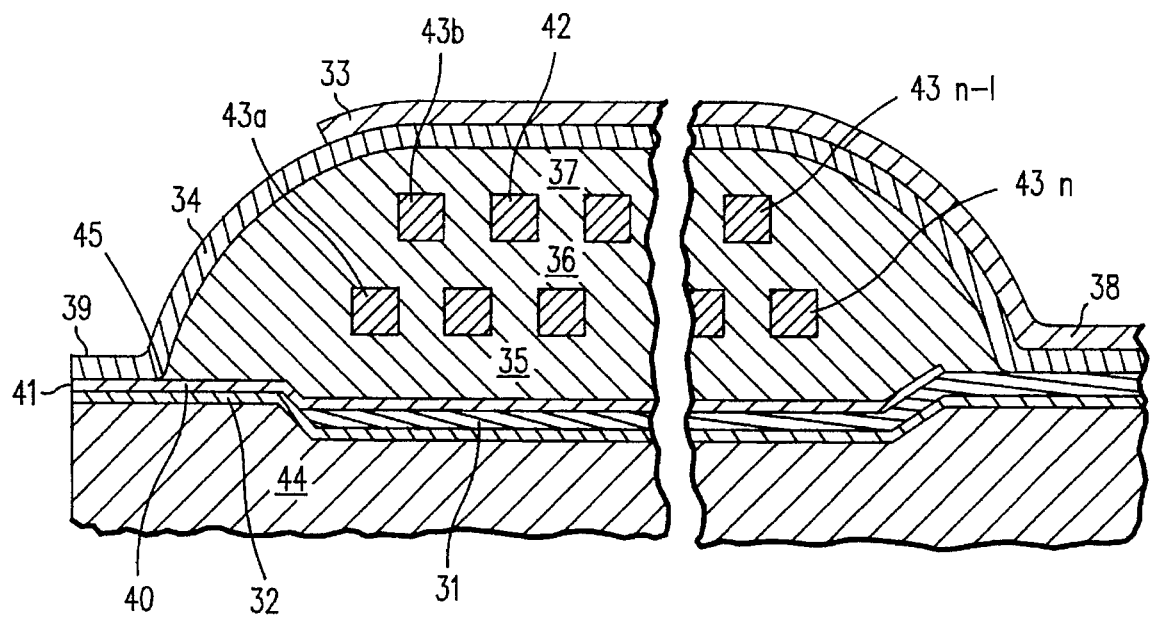
FIG. 4 is a section view taken along the lines 4—4 of FIG. 3.

Referring now to FIGS. 3 and 4, a specific embodiment of a thin film magnetic head according to the present invention is shown. The thin film magnetic head 30 comprises a yoke structure formed of two layers 32 (p1) and 34 (p2) of a magnetic material such as Permalloy, for example. Layers 32 and 34 preferably are deposited in two stages which include shaping layers 31 and 33, respectively. These layers 32 and 34 are separated by insulating layers 35, 36 and 37 except at the back gap region 38, where they make physical contact, and at the pole tip region 39, where they are separated by a thin layer 40 of non-magnetic material to form a transducing gap 41.

According to a feature of the present invention, the width of pole tip region 39 is tapered from the zero throat point 45 to the flare point 46 as will be discussed in greater detail below. A flat conductor coil 42 is included in the space between the layers 32 and 34. Coil 42 has a plurality of turns 43 a–n in two layers plated in an elliptical pattern between layers 35, 36 and 37 of insulating material. The end of transducing gap 41 coincides with an ABS formed on a non-magnetic substrate 44 on which the above-described layers are deposited. Transducer gap 41 interacts in an air bearing relation with the magnetic recording medium, such as rotatable magnetic disk 12. When the magnetic disk rotates, the head 30 flies with the ABS closely adjacent to the disk recording surface 22.

Figure 5:
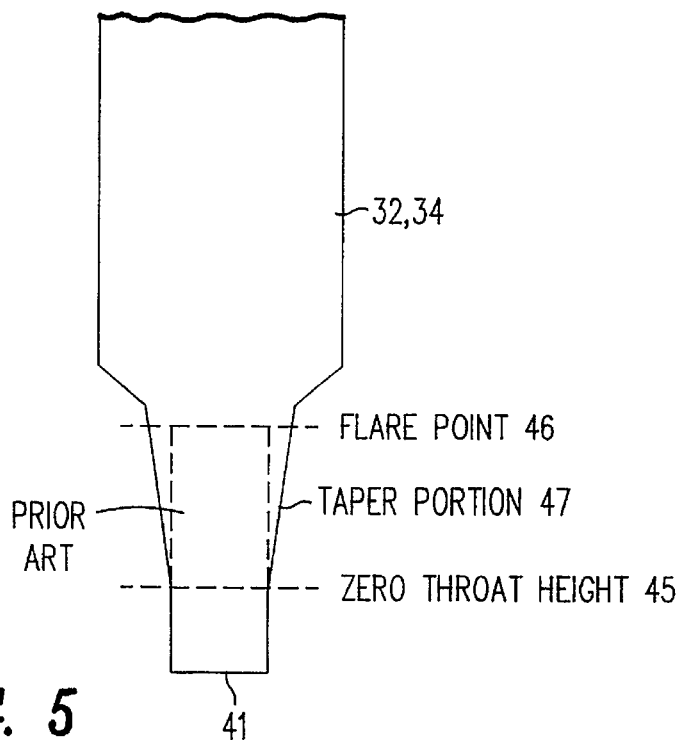
FIG. 5 is an enlarged view of the pole tip region of the thin film magnetic head of FIGS. 3 and 4.

With reference to FIG. 5, The pole tip region 39 of the head 30 comprises a taper portion 47 which extends between the zero throat point 45 and the flare point 46. The zero throat point is defined as the point near the transducing gap 41 where the yoke layers 32 and 34 start to diverge to form the space in which coil 42 is deposited.

Figure 6:
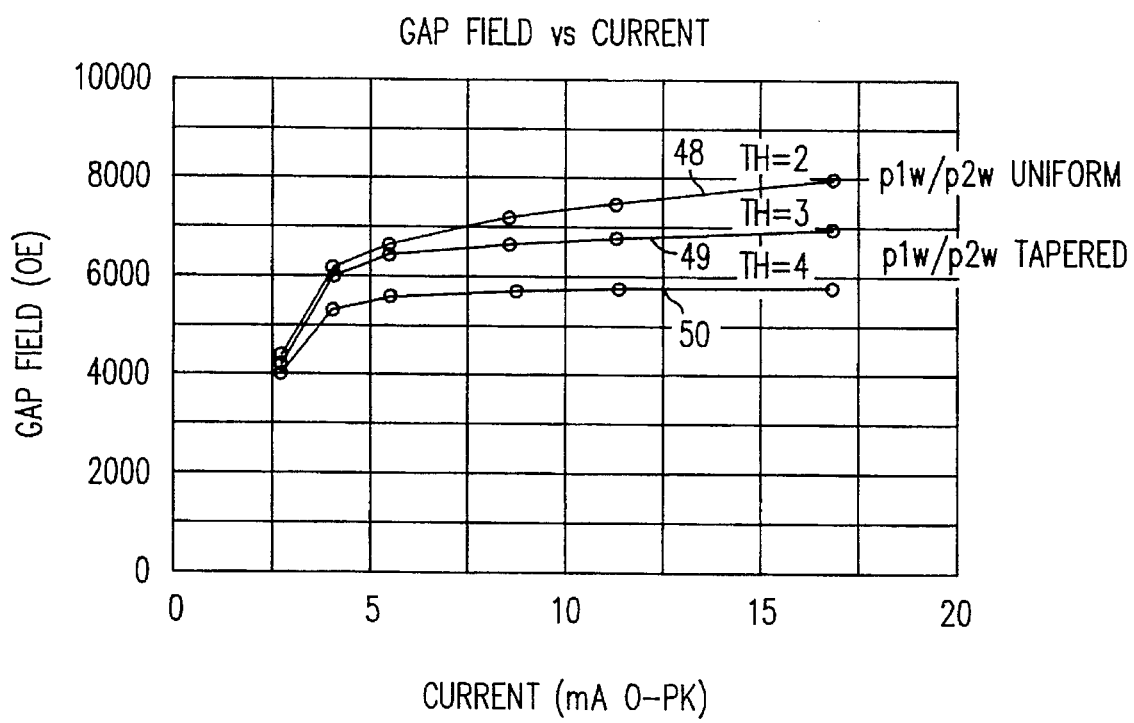
FIG. 6 is a graph of gap field vs. write current which shows one curve for a prior art thin film magnetic head, and curves for two embodiments of the present invention.

The effect on the operation of the thin film magnetic head as a result of tapering the pole tip region can be seen by reference to FIG. 6. The top curve 48 in FIG. 6 shows the prior art structure in which the pole tip regions have a substantially uniform width. This curve shows that, above the saturation current of about 5 mA, the gap field continues to increase with increasing write current.

Figure 7:
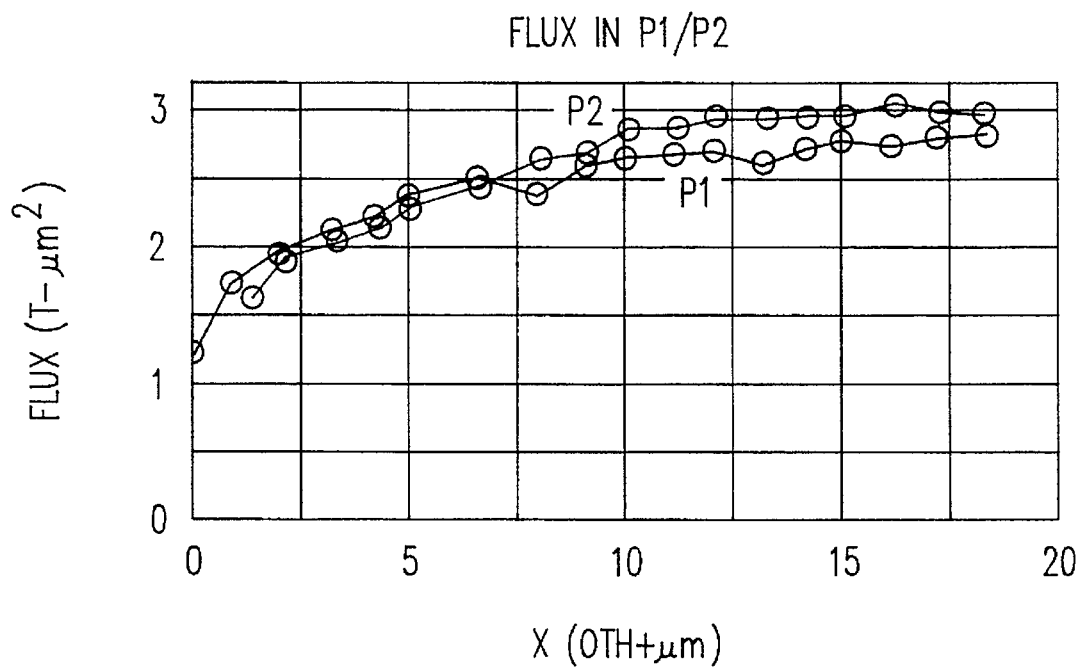
FIG. 7 is a graph which shows the total flux in p1 and p2, prior to saturation, vs. distance along p1 or p2 from zero throat for a prior art thin film magnetic head.

The reason for this can be seen in FIG. 7 which shows the total flux in p1 (32) and p2 (34), prior to saturation, versus distance along p1 or p2 from the zero throat position 45. The highest total flux is near x=18 um (near the flare point 46). The onset of saturation occurs when the point of highest flux density reaches the Bs value of the material used in the head at which point the incremental permeability of that point in the head becomes the same as air, i.e. permeability=1. For further increases in coil current the flux must jump this effective air gap to eventually reach the pole tips. As the current increases, the region of saturation expands and the air gap grows. FIG. 6 shows that, although the length of this region may grow to some microns in length, the flux crosses the effective gap well enough to cause the gap field at the ABS to increase substantially.

In contrast to this prior art operation, the two bottom curves 49 and 50 in FIG. 6 show that saturation occurs at a write current of about 5 mA, but there is no increase in the gap field for further increases in coil current for the embodiments which have tapered pole tip regions.

Figure 8:
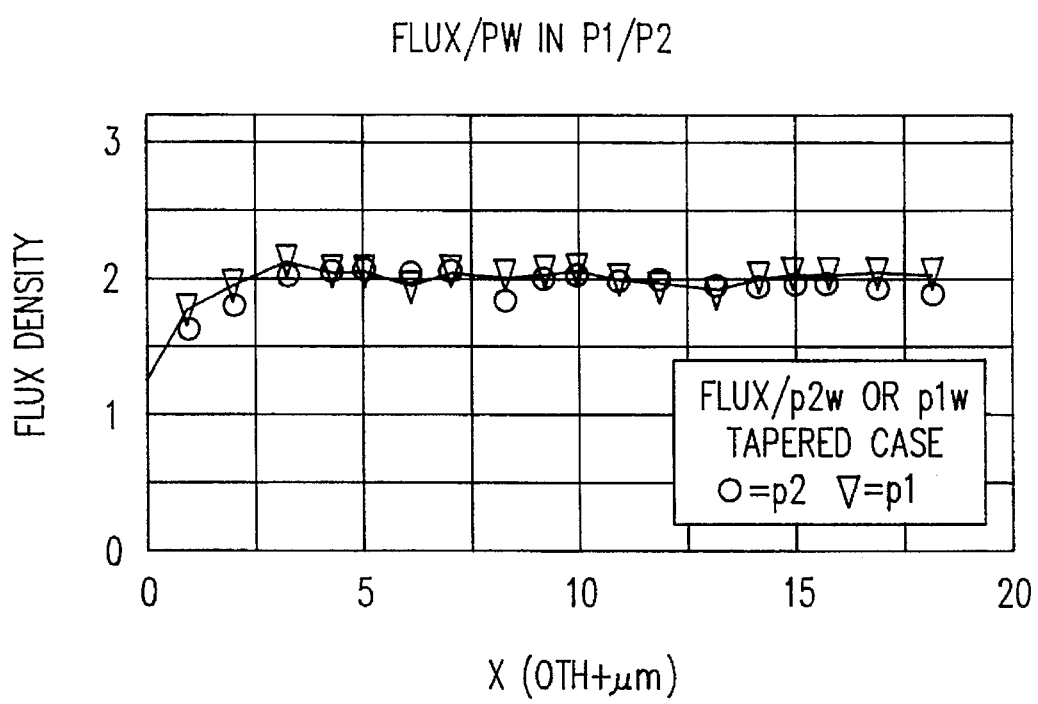
FIG. 8 is graph of flux density vs. distance along p1 or p2 from zero throat according to a specific embodiment of the present invention.

A specific embodiment of the present invention is shown in FIG. 8 in which the widths of both p1 and p2 were progressively increased starting at 3 micron above zero throat and ending at the yoke flare point at x=18 micron. The flux density is seen to be equalized over about a 15 micron length of both p1 and p2. Consequently, when the head enters saturation, it does so over the entire 15 micron lengths simultaneously. This gives a much larger effective air gap for the flux to cross than in the prior art design discussed above, and the increase in gap field at the ABS is greatly reduced compared to the prior art design. This is shown in FIG. 6 in curves 49 and 50.

Figure 9:
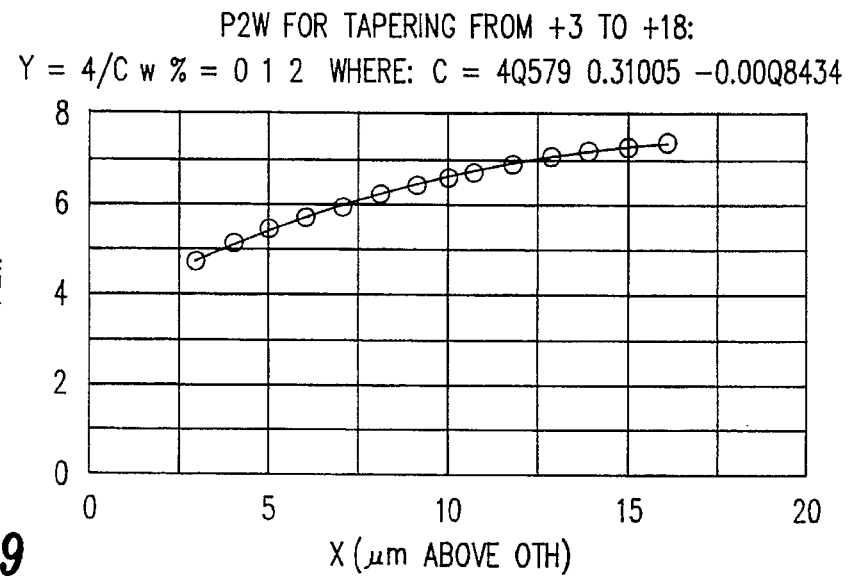
FIG. 9 is a graph showing the taper in the widths of p2 for the specific embodiment shown in FIG. 8.
Figure 12:
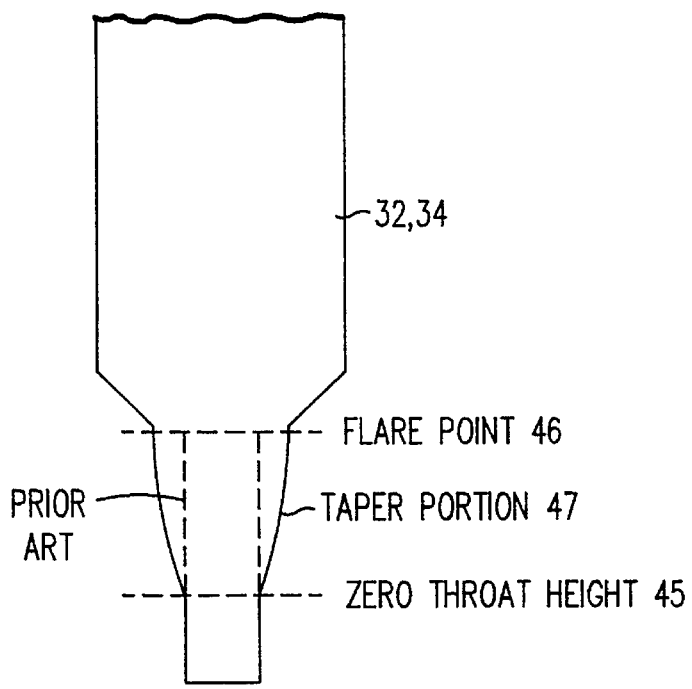
FIG. 12 is a specific embodiment of the present invention showing a continuously curved taper.

It can be shown that trade-offs in design factors can be made so that specific levels of gap field independence of write current can be achieved. The taper of the pole tip regions shown in FIG. 5 is a linear taper, and this represents a close approximation to the ideal taper. However, the actual taper for p2 in the specific embodiment of FIG. 8 is shown in FIG. 9. It can be seen that the actual taper has a slight curvature, so, if the optimum control is required, a continuously curved taper should be used. FIG. 12 shows an enlarged view of the continuously curved taper of the pole tip region of the thin film magnetic head of FIG. 9.

Figure 10:
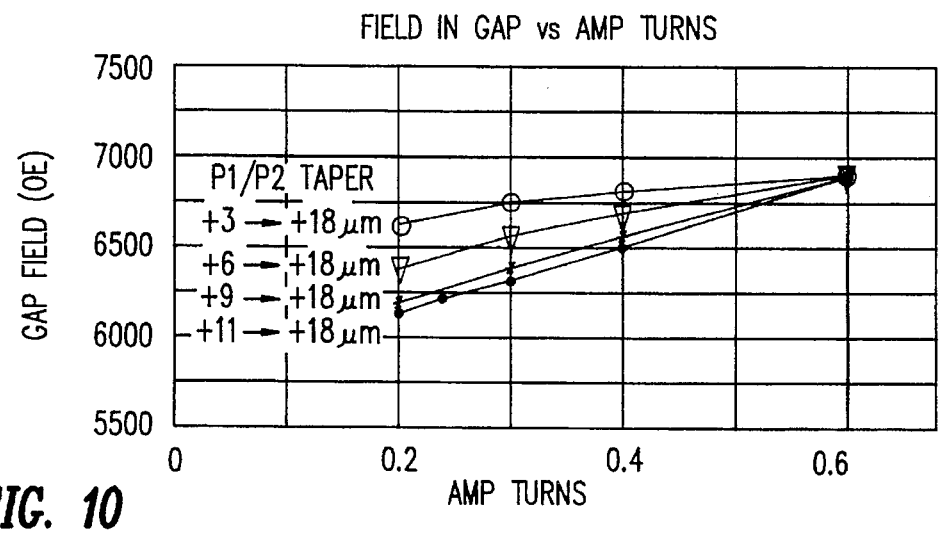
FIG. 10 is a graph showing the length of taper in p1/p2 vs. gap field for the present invention.
Figure 13:
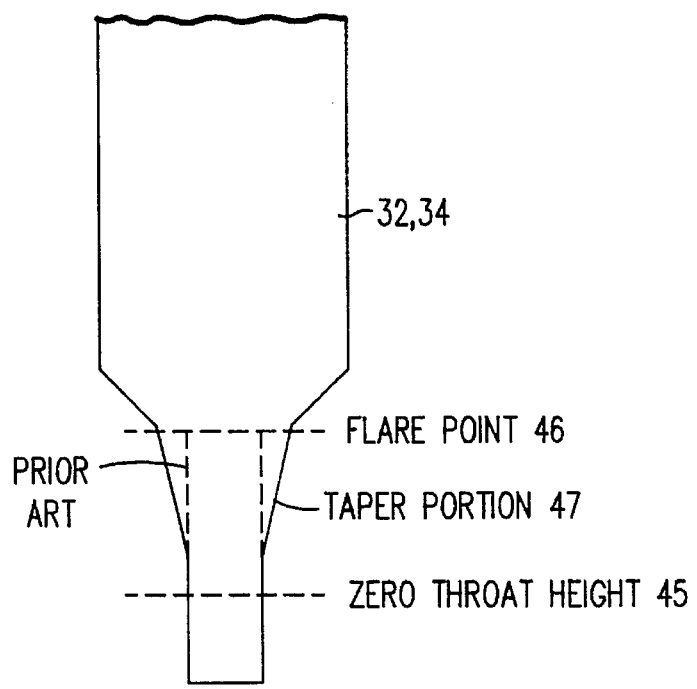
FIG. 13 is a specific embodiment of the present invention showing a partial tapering.

The preferred embodiment is to have both p1 and p2 tapered over as large a length from zero throat to the yoke flare point as possible. However, should a less precise control be sufficient, then this could be obtained by the use of a shorter taper length in the space between zero throat 45 and the flare point 46. Four curves are shown in FIG. 10 which have different taper lengths. These curves show that, as the length of the taper region decreases, the variation in write field with current becomes larger. FIG. 13 shows an enlarged view of one of the partially tapered pole tip region of the thin film magnetic heads shown in FIG. 10.

Figure 11:
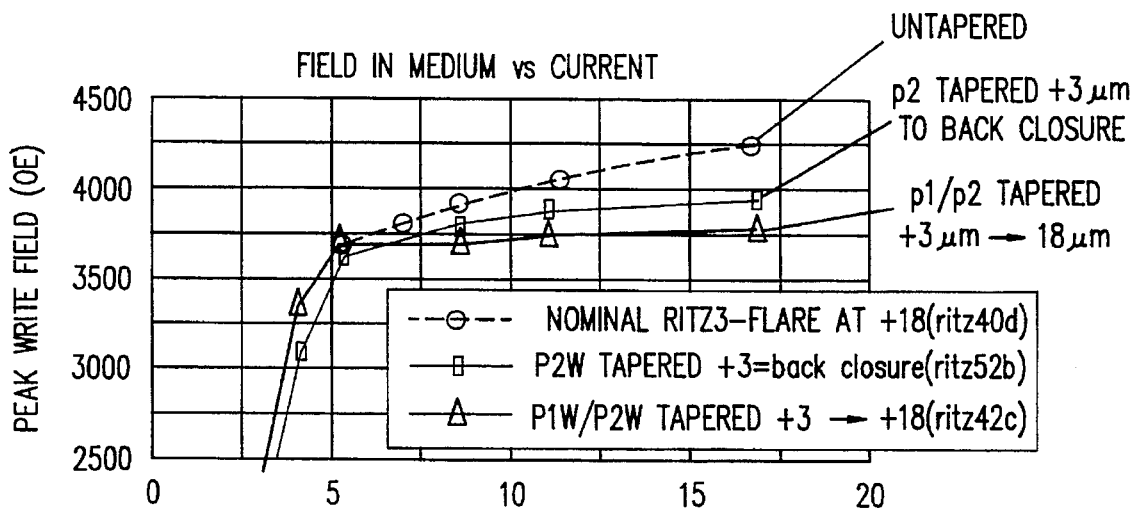
FIG. 11 is a graph of peak write field vs. write current for a prior art magnetic head and two specific embodiments of heads according to the present invention.
Figure 14:
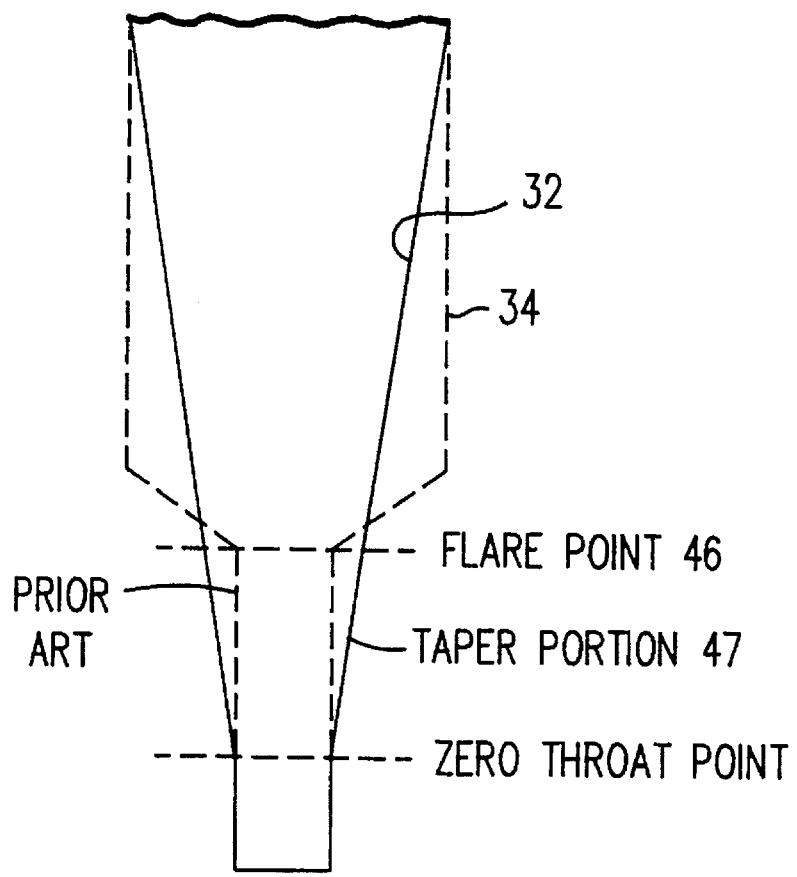
FIG. 14 is a specific embodiment of the present invention showing the tapering in the width of the bottom magnetic yoke layer only.

Another option for trade-off in the design is to taper only p1 or p2. In this case the taper must extend all the way to the back gap region 38. Results for this design are shown in FIG. 11, and, as expected, an intermediate level of write current independence is shown. FIG. 14 shows an enlarged view of a partial thin film magnetic head having a tapered bottom yoke only.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

Having this described our invention, what we claim as new, and desire to secure by Letters Patent is:

1. A magnetic disk recording system comprising:

a magnetic recording medium having a recording surface;

a thin film magnetic head and an air bearing slider supporting said head;

head arm means for supporting said air bearing slider with said magnetic head closely adjacent to the recording surface of said magnetic recording medium;

accessing means for supporting said head arm means and for moving said head arm means relative to the recording surface of said magnetic recording medium;

said thin film magnetic head comprising;

a first magnetic yoke layer extending from a pole tip region to a back gap region;

a second magnetic yoke layer which is separated by a predetermined small distance from said first magnetic yoke layer at said pole tip region to produce a transducing gap, said second magnetic yoke layer begins to diverge from said first magnetic yoke layer at a zero throat point to form a space between said magnetic yoke layers at a central region and is in contact with said first magnetic yoke layer at said back gap region;

said first and said second magnetic yoke layers extending from said zero throat point toward said back gap region to a flare point at which said magnetic yoke layers increase progressively in width;

a yoke structure being activated by a conductor coil deposited in the space between said first and said second magnetic yoke layers;

the width of said first and said second magnetic yoke layers, between said zero throat point and said flare point, increases gradually by a chosen amount to equalize the flux density from said zero throat point to said flare point such that, at a write current applied to said coil, the length of the magnetic yoke layers from said zero throat point to said flare point is saturated simultaneously.

2. A thin film magnetic head comprising:

a first magnetic yoke layer extending from a pole tip region to a back gap region;

a second magnetic yoke layer which is separated by a predetermined small distance from said first magnetic yoke layer at said pole tip region to produce a transducing gap, said second magnetic yoke layer begins to diverge from said first magnetic yoke layer at a zero throat point to form a space between said magnetic yoke layers at a central region and is in contact with said first magnetic yoke layer at said back gap region;

said first and said second magnetic yoke layers extending from said zero throat point toward said back gap region to a flare point at which said magnetic yoke layers increase progressively in width;

a yoke structure being activated by a conductor coil deposited in the space between said magnetic yoke layers;

the width of said first and said second magnetic yoke layers, between said zero throat point and said flare point, increases gradually by a chosen amount to equalize the flux density from said zero throat point to said flare point such that at a write current applied to said coil, the length of the magnetic yoke layers from said zero throat point to said flare point is saturated simultaneously.

3. The thin film magnetic head of claim 2 wherein the width of said first and said second magnetic yoke layers between said zero throat point and said flare point increases linearly.

4. The thin film magnetic head of claim 2 wherein the width of said first and said second magnetic yoke layers between said zero throat point and said flare point curves continuously.

5. A thin film magnetic head comprising:

a first magnetic yoke layer extending from a pole tip region to a back gap region;

a second magnetic yoke layer which is separated by a predetermined small distance from said first magnetic yoke layer at said pole tip region to produce a transducing gap, said second magnetic yoke layer begins to diverge from said first magnetic yoke layer at a zero throat point to form a space between said magnetic yoke layers at a central region and is in contact with said first magnetic yoke layer at said back gap region;

said first and said second magnetic yoke layers extending from said zero throat point toward said back gap region to a flare point at which said magnetic yoke layers increase progressively in width;

a yoke structure being activated by a conductor coil deposited in the space between said magnetic yoke layers;

the width of said first and said second magnetic yoke layers increases gradually over a substantial part of the distance between zero throat point and said flare point, to equalize the flux density over said substantial part of the distance such that, at a write current applied to said coil, said substantial part of the distance is saturated simultaneously.

6. A thin film magnetic head comprising:

a substrate;

a bottom magnetic yoke layer formed over said substrate and extending from a pole tip region to a back gap region;

a top magnetic yoke layer formed over said bottom magnetic yoke layer and which is separated by a predetermined small distance from said bottom magnetic yoke layer at said pole tip region to produce a transducing gap, said top magnetic yoke layer begins to diverge from said bottom magnetic yoke layer at a zero throat point to form a space between said magnetic yoke layers at a central region and is in contact with said bottom magnetic yoke layer at said back gap region;

said bottom and said top magnetic yoke layers extending from said zero throat point toward said back gap region to a flare point at which said magnetic yoke layers increase progressively in width;

a yoke structure being activated by a conductor coil deposited in the space between said magnetic yoke layers;

the width of said bottom magnetic yoke layer, between said zero throat point and said back gap region, increases gradually by a chosen amount to equalize flux density from said zero throat point to said back gap region such that, at a write current applied to said coil, the length of said bottom magnetic yoke layer from said zero throat point to said back gap region is saturated simultaneously.

* * * * *